Jan. 16, 1962   L. N. BRAMLEY   3,017,551
REMOTE CONTROL

Filed June 6, 1957   2 Sheets-Sheet 1

INVENTOR
LIONEL NAPIER BRAMLEY
BY Hane and Nydith
ATTORNEYS

INVENTOR
LIONEL NAPIER BRAMLEY
BY Hame and Nylish
ATTORNEYS

United States Patent Office

3,017,551
Patented Jan. 16, 1962

3,017,551
REMOTE CONTROL
Lionel Napier Bramley, Farnborough, England, assignor to The British Iron & Steel Research Association, London, England, a British company
Filed June 6, 1957, Ser. No. 664,140
Claims priority, application Great Britain June 8, 1956
5 Claims. (Cl. 318—29)

This invention relates to the remote control of the position of operating elements. The invention is particularly concerned with the remote position control of the screwdown of rolling mills but it will be immediately apparent that it is equally applicable to the control of other devices, such as other auxiliary drives of rolling mills and the jaws and dies of presses.

The present invention resides in a remote control system comprising an electric motor for controlling the value of a condition, means for generating an electrical difference signal in accordance with the difference between the value of the condition and a datum value, and an amplifier for amplifying the difference signal and applying it to the motor.

The invention is illustrated by the following description of a system for the remote control of screwdown position of the rolls of a rolling mill, reference being made to the accompanying drawings in which.

Figure 1:
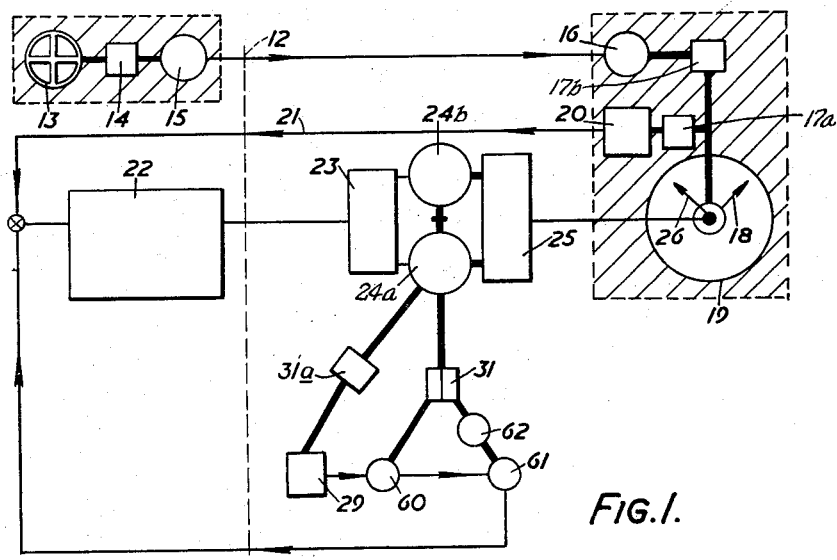
FIGURE 1 illustrates schematically the system as a whole.

In rolling mills, screwdown is usually controlled manually by the operator at a position located some distance from the mill itself. In the past, the operator has controlled the speed of the electric motors driving the screws of the screwdown mechanism, and, in order that the rolls should be brought to a given screwdown setting it was necessary for the operator to de-energize the motors when he judged that the subsequential run-on of the motors would carry the rolls to that setting. This procedure required the operator to have considerable skill and often resulted in loss of time when de-energisation was initially misjudged.

In the system illustrated in the drawing, the operator is required merely to set up the setting desired for the rolls, the system operating automatically to bring the rolls to that setting.

In the drawing the parts to the left of the dotted line 12 are located at the operator's cab while those to the right are at the rolling mill itself. At the cab, there is a setting hand wheel 13, which is coupled through gearing 14 to the transmitter 15 of a power selsyn or other remote control link, the receiver 16 of which is located at the mill. The receiver 16 is coupled through gearing 17a to the setting hand 18 of a large indicator 19 arranged so as to be visible from the cab and through additional gearing 17b to the slider of a potential divider 20. The electrical output from the potential divider 20 is connected through line 21 to the input of a relay unit 22 at the cab.

The output of the relay unit is applied through starting unit 23 of known type incorporating contactors for the control of the two screwdown motors 24a, 24b of the mill 25. The setting of the mill rolls is indicated by a second hand 26 of the indicator 19.

In order to control the motors 24a, 24b so that they are cut out at the correct time, there is a feed-back link consisting of a second potential divider 29 the slider 29a of which is driven, through gearing 31a, by the motors 24a, 24b. The voltage from this potential divider is added algebraically to the voltage from tacho-generators 60 and 61 which are driven from the motors 24a, 24b through the gearing 31. The algebraic sum of the voltages is applied to the input of relay unit 22 in position to that on line 21.

Figure 2:
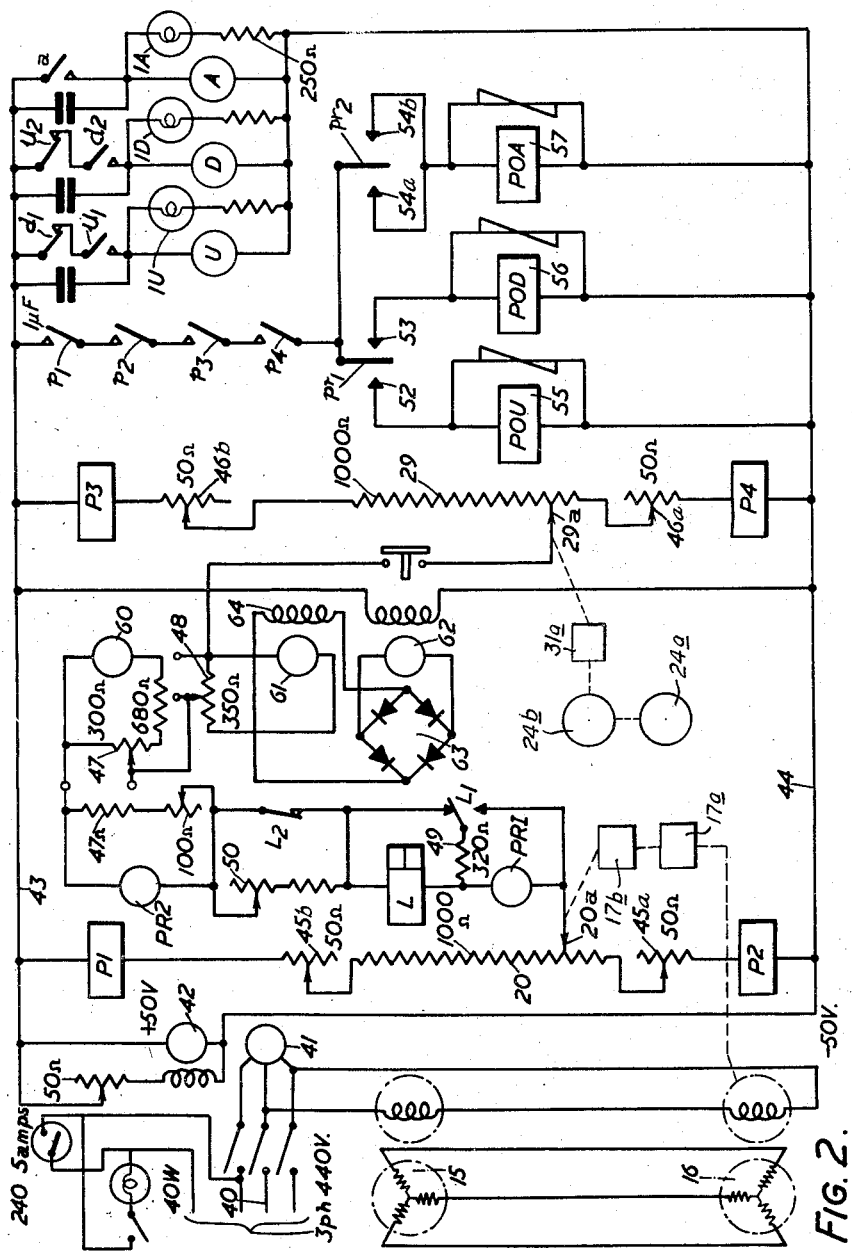
FIGURE 2 is a circuit diagram.

The control circuit is illustrated in FIGURE 2. In this figure, the three-phase mains supply 40 is applied to a motor 41 which drives a 50 v. D.C. generator 42. One of the phases of the mains supply 40 are tapped to energise the rotor windings of the selsyn transmitter 15 and receiver 16. The generator 42 energises a positive line 43 and a negative line 44 between which the two potential dividers 20, 29 are connected, potential divider 20 being connected in series with relays P1, P2 and shift potentiometers 45a, 45b. Similarly, potential divider 29 is connected in series with relays P3, P4 and trimming potentiometers 46a, 46b.

The slider 20a, which is coupled to the selsyn receiver 16 through gearing 17a, 17b, is connected to a first polarised relay PR1 which is connected through a series circuit consisting of an overload relay L, a second or accelerating polarised relay PR2 and potential dividers 47, 48 to the slider 29a of potential divider 29 which is driven by the mill through the gearing 31a. Relay L is normally shunted by a resistor 49 and contacts L1 of relay L while a series resistance 50 for relay PR2 is normally shunted out by contacts L2 of rleay L. When relay L is energised, contacts L1 change over and complete a shunt circuit for relay PR1 through resistor 49, while contacts L2 open to put in circuit series resistor 50.

The voltage applied across the series circuit of relays PR1, L, PR2 is dependent on the difference of the voltages of the sliders 20a, 29a and therefore on the difference between the setting desired for screwdown and the actual position of screwdown. When this difference is small, e.g. greater than $\frac{1}{500}$ and less than $\frac{10}{500}$ of the total travel of the rolls, only relay PR1 is energised and its moving contacts pr1 engages its up-contact 52 or its down-contact 53 according to the direction of current flow. If the difference is large, e.g. greater than $\frac{10}{500}$ of the total travel of the rolls, polarised relay PR2 is also operated to cause its moving contact pr2 to engage one of its fixed contacts 54a, 54b. When the difference is so great that current flowing through the series circuit is liable to damage the polarised relays PR1, PR2, e.g. is over 20 ma., the overload relay L is operated to apply the shunt resistor 49 to relay PR1 and the series resistor 50 to relay PR2.

The contacts $p_1$, $p_2$, $p_3$, $p_4$ of relays P1, P2, P3 and P4 respectively are connected in series between line 43 and the moving contacts $pr_1$, $pr_2$. Up-contact 52 of relay PR1 is connected through an "up"-relay POU to line 44, "down"-contact 53 is connected in series with a "down"-relay POD to line 44 and contacts 54a, 54b are both connected through an accelerating relay POA to line 44. Relays 55, 56, 57 are British Post Office type 3000 relays.

Relays POU, POD, POA control the energisation of three British Post Office type 7013 relays U, D, A. Thus, relay U is connected between lines 43, 44 by normally closed contacts $d_1$ of relay POD and normally open contacts $u_1$ of relay POU; relay D is connected between lines 43, 44 by normally closed contacts $u_2$ of relay POU and normally open contacts $d_2$ of relay POD; while relay A is connected between lines 43, 44 by normally open contacts $a$ of relay POA. Indicator lamps 1U, 1D, 1A are connected in parallel with relay U, D and A respectively.

When relay POU is energised, its normally open contacts $u_1$ close and complete the circuit from line 43, through closed contacts $d_1$, $u_1$ to relay U and lamp 1U, and thence to line 44, thus energising relay U and lighting lamp 1U. If, on the other hand, relay POD is energised, its normally open contacts $d_2$ close and with normally closed contacts $u_2$ complete a circuit to energise relay D. The arrangement of contacts $u_1$, $u_2$, $d_1$, $d_2$ are such that relays U, D can never be energised simultaneously, even if one of relays POU, POD is slow in releasing after change over of contact $pr_1$ from one to the other of contacts 52, 53.

Relays U, D, A have contacts in starting unit 23 controlling the contactors of that unit to cause the motors 24a, 24b to drive the mill rolls upwards and downwards when relays U and D are energised alone and to accelerate the upward and downward movement when relay A is energised in conjunction with relays U and D respectively.

In operation, the operator turns the hand wheel 13 until the desired roll setting is indicated by the hand 18 on the indicator 19. The slider 20a is of corresponding voltage and the difference voltage applied to relay PR1 causes its contact $pr_1$ to engage contact 52 or 53 according as the desired setting is above or below the actual setting of the mill. Relay POU or POD is energised and causes the motors 24 to be driven in the appropriate direction, through the operation of relays U or A and the contactors in unit 23. Where the difference voltage is large, relay PR2 is also energised, its contacts $a$ close and relay A is energised to accelerate the motors 24a, 24b.

Relays PR1, PR2 are sensitive to small current changes but their contacts control relatively larger currents for the operation of relays POU, POD, POA. The contacts of these last relays in turn control larger current for the operation of relays U, D, A the contacts of which are capable of controlling the still larger currents required for the operation of the motor contactors in starter unit 23. The chain of relays PR1, PR2; POU, POD, POA; U, D, A, therefore acts as a high gain amplifier which is robust and reliable in operation compared with conventional electronic amplifiers.

The system so far described is a simple position-positive control and if no other elements were provided the motors 24a, 24b would cut out when the voltages from the two potential dividers were substantially equal, i.e. when the roll setting had been moved to the value set up by the operator. The run-on of the motors would however result in the roll setting being taken beyond the desired value with the result that the desired value would be achieved only after a series of over- and under-compensations. In order to prevent this, there is applied in opposition to the difference voltage from potential dividers 20, 29 a back-off voltage proportional to $V \pm kV|V|$ where V is the speed of the motors and $|V|$ is the modulus of V. This back-off voltage is derived from a permanent magnet D.C. tacho-generator 60 and two other D.C. tacho-generators 61, 62, all driven by the motors 24a, 24b. The current from generator 62 is applied through rectifier 63 to produce a current proportional to $|V|$. This current is applied to the field winding 64 of generator 61, the output voltage of which is proportional to $V|V|$ and is applied across potential divider 48. The voltage generated by generator 60 is proportional to V and is applied across potential divider 47. The value of the constant $k$ depends on the settings of the sliders on potential dividers 47, 48.

By virtue of the back-off voltage, the relay PR1 is de-energised and the motors 24a, 24b are de-energised at a time interval before the difference voltage reaches zero and before the roll setting reaches the desired value. This time interval is dependent on the speed of the motors. After de-energisation, the motors run on under their momentum and come to rest with the roll setting at or nearly at the desired value.

Relays P1—P4 are provided as a safety precaution and ensure that the motors 24a, 24b will not be operated if any open-circuit develops in the circuits of potential dividers 20, 29. During normal operation, relays P1—P4 are all energised by the current flow in potentiometers 20, 29 and contacts $p_1$—$p_4$ are all closed and complete the circuit to contacts $pr_1$, $pr_2$. If an open circuit in the circuits of potential dividers 20, 29 should occur, one of relays P1—P4 remain de-energised and thereby prevents energisation of any of relays POU, POD, POA. Without relays P1—P4, an open-circuit would result in the motors 24a, 24b being driven continuously in one direction until damage was caused.

The sliders of potentiometers 45 are ganged together to move together in the same direction. They are employed to adjust initially the setting of the mill to the setting of the hand 18. The sliders of potentiometers 46 are also ganged together but they are arranged to move in opposite directions. These potentiometers are provided to enable the change of voltage of slider 29a for unit movement of the setting of the rolls to be adjusted to match the change in voltage of slider 20a for unit indicated movement of hand 18.

When the mill is to slab- and edge-roll, the indicator may be provided with a third hand, indicative of the setting desired when edge-rolling, the hand 18 being indicative of the setting desired when slab-rolling. At the cab there may be a double magnetic clutch control unit by which the hand wheel 13 and the potential divider 20 may be coupled alternatively to one or other of the two setting hands. By operating this control, the rolls can be changed automatically from a slab-rolling setting to an edge-rolling setting and vice versa without use of the hand wheel 13, and this arrangement has the advantage that when slab-rolling the system retains a memory of the last "edge" rolling past the setting so that it may be returned to at will.

The provision of the indicator 19 at the mill avoids any need for the control operator to take his eyes off the mill; there need be nothing at the pulpit indicating roll setting, it being understood that the hand wheel 13 is merely operated until the hand 18 reaches the desired setting, the position of the rolls as indicated by the hand 26 following up the change in setting of hand 18.

The locating of the potential divider 20 at the mill and the fact that it is directly connected with the setting hand 18 precludes any possibility of error arising in the operation of the system due to errors in the selsyn control chain 14, 15, 16, 17a, 17b. If the potential divider were coupled to the hand wheel 13 and error occurred in the control chain there would be a discrepancy between the position of the hand 18 and the postion of the potential divider so that the rolls would be brought to a setting different from that indicated by the hand 18. In the system illustrated any error in the selsyn link is immaterial since the operator controls the operation by the position of hand 18 which, by virtue of the direct connection between it and potential divider 20, determines the setting to which the rolls are to be brought.

In place of, or in addition to, the hand wheel 13 there may be provided means for presetting the roll setting. These means, which may take the form of a series of control buttons, automatically alter the roll setting, when operated, by predetermined amounts and cause the hand 26 and the rolls to take up desired positions. By choice of button various initial roll settings and drafts may be obtained at will and this allows the operator to modify the programme to suit various circumstances, e.g. too cold an ingot can be compensated by choosing a reduced draft. When push buttons are used the potential divider 20 is replaced by switching digital potential dividers and the setting hand may be dispensed with.

In place of, or in addition to, the hand wheel there may be provided means for turning the input potential divider or dividers by means of a ratchet device which can be preset to turn the dividers any one of a series of steps of different magnitude upon operation of a handle. This ratchet device also may be combined with a double magnetic clutch actuator so that either "slab" or "edge" setting can be used at will as the system input whilst the edge or slab setting not in use is retained as a memory for future use.

What is claimed, is:

1. In a remote position control system of the kind including a variable speed electric motor for controlling the position of an object to be controlled, means for generating an electrical position signal according to the position of the object, and means for generating an electric datum signal in accordance with the position desired for the object, the combination with an amplifier controlling said electric motor, the amplifier comprising a first chain of relays and a second chain of relays, the contacts of each relay in each said chain controlling the operation of the next relay in the same chain so that in each chain the relays operate successively in cascade, and the successive relays in each chain being adapted to control successively higher currents, the first relays of said first and second chains being connected in series between said means for generating said position signal and said means for generating said datum signal, whereby said first relays are energised by a difference signal according to the difference between said position and datum signals, and the first relay of said first chain being arranged to be operated by relatively small difference signals and the first relay in said second chain being arranged to be operated only by relatively large difference signals, and means operated by said first chain and said second chain for causing said motor to operate at a relatively slow speed and a relatively fast speed respectively.

2. In a remote position control system of the kind including a variable speed electric motor for controlling the position of an object to be controlled, means for generating an electric position signal according to the position of said object, means for generating an electric datum signal in accordance with the position desired for the object, and means for generating an electric difference signal according to the difference between said position and datum signals, the combination with an amplifier to which said difference signal is applied and the output of which controls said electric motor, the amplifier comprising a first chain of relays and a second chain of relays, the contacts of each relay in each said chain controlling the operation of the next relay in the same chain so that in each chain the relays operate successively in cascade, and the successive relays in each said chain being adapted to control successively higher currents, the first relay of said first chain being arranged to be operated by relatively small difference signals and the first relay in said second chain being arranged to be operated only by relatively large difference signals; means operated by said first chain and said second chain for causing said motor to operate at a relatively slow speed and a relatively fast speed respectively; an overload device arranged to be operated when the difference signal exceeds a safe value for the first relays of said chains; and means controlled by the operation of said overload device for introducing impedance in the circuits of said first relays.

3. A remote position control system according to claim 2 in which the overload device is an overload relay which is connected in series with the first relays of the two chains and which has contacts arranged to introduce the impedances into the circuits when the overload relay is operated.

4. In a remote position control system of the kind including a variable speed electric motor for controlling the position of an object to be controlled, means for generating an electric position signal according to the position of said object, means for generating an electric datum signal in accordance with the position desired for said object, and means for generating an electric difference signal according to the difference between said position and datum signals, the combination with an amplifier to which said difference signal is applied and the output of which controls said electric motor, the amplifier comprising a polarised relay to which said difference signal is applied and which is arranged to operate a first sequence of relays and a second sequence of relays respectively according to the sense of the difference between said position signal and said datum signal, the contacts of each relay of each said sequence controlling the operation of the next relay in the same sequence so that, in each sequence, the relays operate successively in cascade, and successive relays in each sequence being adapted to control successively higher currents, the two sequences of relays being arranged to operate said motor to drive said object in different directions.

5. In a remote control system of the kind including an electric motor for controlling the position of an object to be controlled, means for generating an electrical difference signal dependent upon the difference between the position of said object and a datum position desired for said object, an amplifier the output of which controls said electric motor, and means for applying said difference signal to the input of said amplifier, the combination with a feed-back link for feeding a signal back to the amplifier, said feed back link comprising three tachogenerators each having a field winding, said generators being driven by said motor, a rectifier circuit connected to the output of one of said tachogenerators and feeding the field winding of another one of said tachogenerators, means for algebraically adding together the voltages generated by said other tachogenerator and by the third of said tachogenerators to produce a feed-back signal, and means for applying said feed-back signal to the input of said amplifier in opposition to said difference signal.

References Cited in the file of this patent

UNITED STATES PATENTS

| | | |
|---|---|---|
| 2,410,283 | Garr | Oct. 29, 1946 |
| 2,565,734 | Lundahl | Aug. 28, 1951 |
| 2,708,254 | Macaulay et al. | May 10, 1955 |
| 2,766,412 | Stephenson | Oct. 29, 1956 |
| 2,796,569 | McDonald et al. | June 18, 1957 |
| 2,905,877 | Ciscel | Sept. 22, 1959 |